United States Patent Office 3,282,367
Patented Nov. 1, 1966

3,282,367
FOUR-WHEEL DRIVE TRACTORS WITH TRAILER ARTICULATION MEANS MOVED LATERALLY AUTOMATICALLY IN RESPONSE TO THE RELATIVE ANGULAR POSITIONS OF THE TRACTOR AXLES
Leonard S. Mathew, Kingswood, Surrey, and George W. A. Chapman, Croydon, Surrey, England, assignors to Matbro Limited, Horley, Surrey, England, a British company
Filed Apr. 8, 1963, Ser. No. 271,119
Claims priority, application Great Britain, Apr. 9, 1962, 13,647/62
6 Claims. (Cl. 180—51)

The present invention relates to four-wheel drive tractors of the type having a pair of driving axles, which can be rotated with respect to each other for steering purposes, about a vertical axis lying between the axes of the driving axles, preferably equidistant from the two axles. In such tractors it is also necessary to provide a horizontal longitudinal pivot axis to enable the unsprung axles of the tractor to pivot in relation to each other to permit the wheels of the tractor to adjust to the inequalities of the terrain over which the tractor may be travelling. In some constructions of a tractor of the present type the engine is rigidly supported upon one axle and the other axle has two degrees of freedom of movement in relation both to the first axle and to the engine. In a preferred construction, however, the first axle pivots in relation to the engine, which is supported by it, about a horizontal axis, which is perpendicular to the axle, the engine itself being rotatable only about the vertical pivot axis in relation to the other axle. The present invention, however, relates to four-wheel drive tractors of both these types.

Tractors of this type have been employed either as bare towing tractors or, more usually, as rear-engined shovel loaders. They have not been used, so far as we are aware, as the tractor element of an articulated combination.

If a tractor of this type were to be employed in an articulated earth moving combination, towing equipment, such as a wheeled scraper or towed dumper, provided with a swan neck, would be supported directly on the tractor and articulate in relation to the tractor. It would be preferred for the articulation point to be somewhere in the region of the middle of the tractor so as to equalise as far as possible the load on the front and rear wheels and for this purpose the vertical steering pivot preferably lies between the engine and the king post which supports the swan neck of the towed equipment. Although the articulation point would not necessarily be coincident with the centre of the vehicle, it would at least be on the same side of the engine-supporting axle as the vertical steering pivot. It will be appreciated that when the steering of the tractor is operated, the articulation point will move to a position outward of the line joining the centres of the axles, so that the load at the articulation point exerts an overturning force on the tractor. In order to overcome this difficulty, according to the present invention, a four-wheel drive tractor of the present type is provided with a movable articulation point, which is automatically moved laterally by an amount dependent upon the relative angular position of the front and rear axles. The articulation point is preferably provided upon a carrier, which is moved laterally of the tractor by an amount dependent upon the amount of steering applied to the vehicle. Since the steering of a tractor of this type is effected by means of a hydraulic jack, which is employed to determine the relative angular positions of the front and rear axles about the vertical pivot axis, it will readily be appreciated that the necessary correction can be automatically applied at the same time as the steering by means of a hydraulic jack which moves the articulation point by an amount dependent upon the jack extension.

A preferred arrangement, however, includes an articulation point connection means mounted eccentrically on a rotatable member, which is turned in response to relative angular movement of the two axles of the tractor about the vertical steering pivot. This can be arranged by providing a gear on the member, which carries the articulation point connection means, usually a king post, this gear engaging with a fixed gear on the other part of the machine.

Although the arrangement of the present invention is a very useful stabilisation measure when the combination of tractor and scraper (or other like articulated attachment) is exercising a digging function or is travelling over rough ground, it does have the drawback that it increases the tendency of the scraper wheels to cut in relation to the path followed by the tractor wheels. This can be a disadvantage when the machine is being driven in an unladen condition on the public roads, and it is desired, for example, to turn in through a narrow gateway into a yard. In order to improve the steering characteristics under those conditions, a manual overriding control is preferably provided to prevent the lateral movement of the articulation point or, indeed, even to permit the articulation point to be moved even further outwardly of the centre line between the centres of the front and rear axles. Care would have to be taken by the operator to see that such an overriding control was only operated when the machine was unladen, in which condition the overturning effect of the scraper bucket would be much less than it would be when the scraper bucket was loaded to maximum capacity.

Physical embodiments of tractors made in accordance with the present invention are hereinafter described with reference to the accompanying drawings, wherein.

Figure 1:
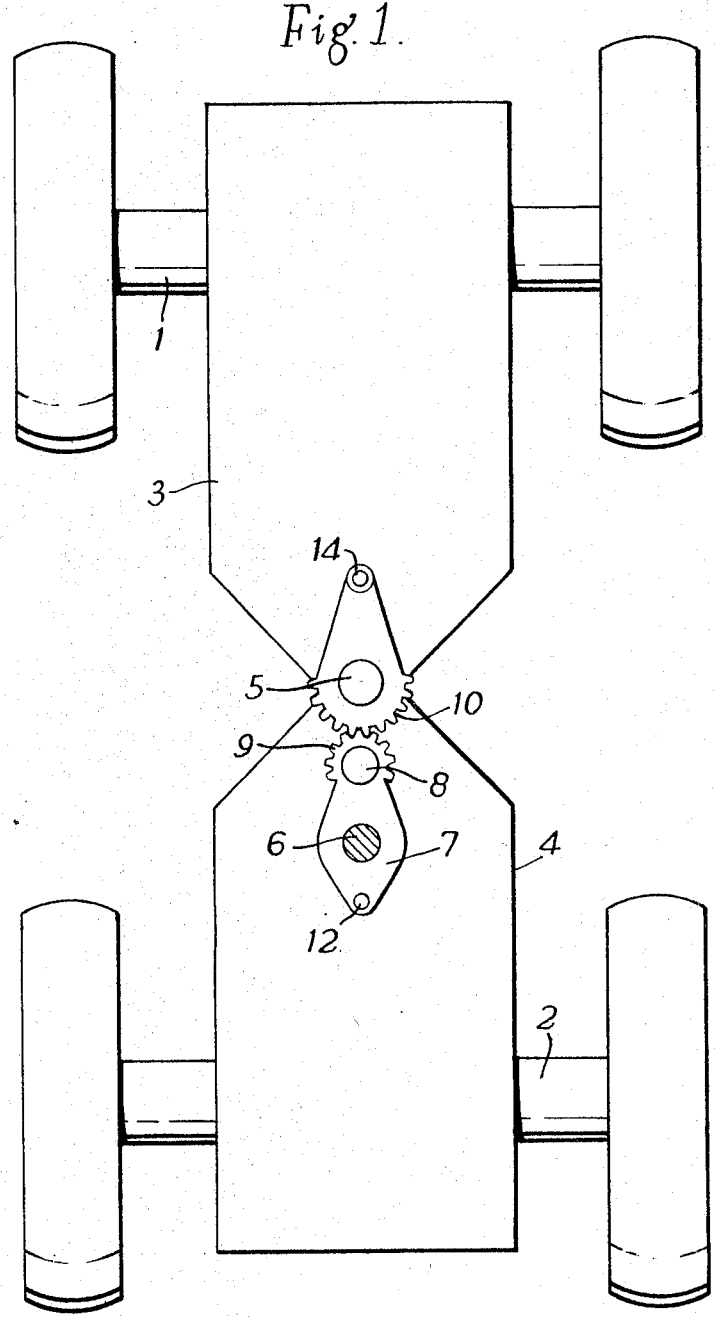
FIGURE 1 is a diagrammatic plan view of one form of tractor.

The tractor shown in the drawings comprises a pair of driving axles 1 and 2, which are rigidly secured to frames 3 and 4, which are pivotally connected to each other by vertically spaced pins 5 so that the axles 1 and 2 may turn in relation to each other about a vertical axis, which is preferably equidistant from the axles 1 and 2.

The engine and gear transmission is mounted on the frame 3 and likewise the driver's seat is mounted on the forward frame 3, so that the rear frame 4 may present a low and relatively unobstructed platform for the support of a swan neck of an articulating trailed vehicle, which may be a load-carrying trailer, a towed scraper or dumper.

The axle 1 is pivotally connected to the frame 3 so as to tilt in relation to the frame about a horizontal axis extending longitudinally of the frame 3.

The steering of the tractor is effected by one or more steering jacks, which are pivotally connected to the frames 3 and 4 and are employed to vary the angle between the axes of the axles 1 and 2. The steering jacks do not form part of the present invention and are omitted from the drawings for simplicity.

In the construction shown in FIGURE 1 the movable articulation point connection means is comprised of a king post 6, which is carried on an arm 7 pivoted on a stout bearing pin 8. The arm 7 carries a gear or gear segment 9 rigidly secured thereto concentrically with the pivot bearing pin 8. The gear segment 9 is engaged by a fixed gear segment 10, arranged concentrically with the steering pivot 5 and normally held fast with the frame 3 by a pin in aperture 14.

The radii of the gear segments 9 and 10 are selected so that the arm 7 is rotated through 180°, whilst the front axle is moved from full lock on one side to full lock on the other side.

It will be seen that the arrangement is effective to move the king post laterally by an amount which is dependent on the relative angular positions of the front and rear axles.

In order to permit the means for moving the king post to be overridden the arm 7 is provided with an aperture 12 to receive a pin, by means of which the arm 7 may be pinned to the body 4, whilst the fixed gear segment 10 is provided with a like aperture 14, which also receives a pin, by means of which the gear segment 10 is normally held against rotation on the pivot pin 5.

Figure 2:
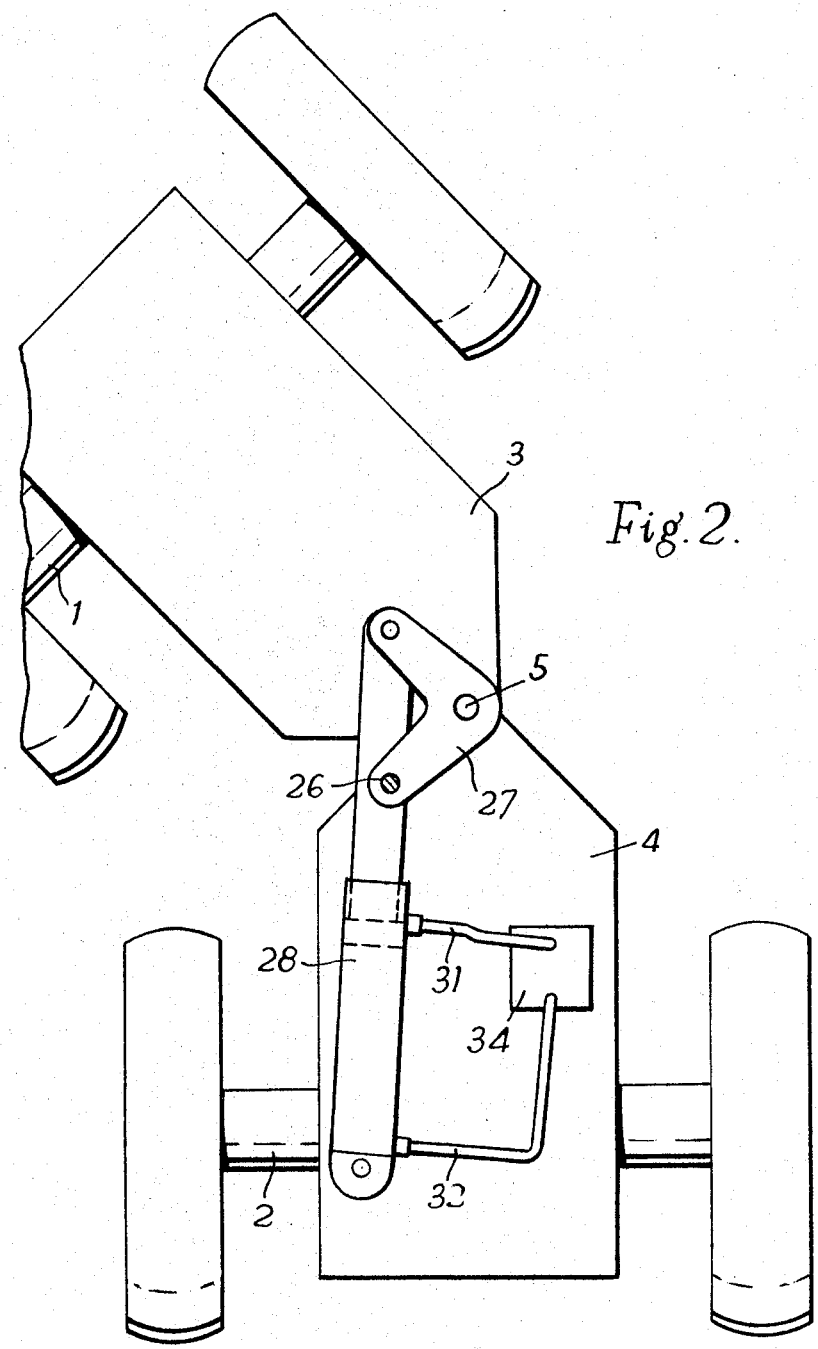
FIGURE 2 is a diagrammatic plan views of another arrangement including a movable king post.

The articulation point for the trailing vehicle in the arrangement shown in FIGURE 2 is comprised by a king post 26, which is carried on an arm 27 pivoted on one of the pins 5 or on a member co-axial therewith. The arm 27 preferably carries a roller projecting from its undersurface and riding on a table member supported on the rear frame 4 so as to take the load off the pivot pin, although this may not be essential.

A compensating jack 28 lies beneath the table, if used, and is connected to the arm 27 and is also pivotally connected to the frame 4.

The function of the compensating jack 28 is to move the king post 26 laterally by rotation of the arm 27 by an amount dependent on the angle which the axles 1 and 2 make with each other. For this purpose the jack 28 is provided with hydraulic lines 31 and 32, which connect the space on opposite sides of the jack piston with a valve 34. When the steering jack is operated to change the relative angular positions of the axles 1 and 2, the valve 34 is operated to supply fluid to the compensating jack 28 so as to move the king post 26 to the position appropriate to the relative angular positions of the two axles 1 and 2, the valve 34 being shut off by a conventional follow-up mechanism when the king post 26 has reached the appropriate position.

Means may be provided for operating the valve 34 by hand and overriding the follow-up mechanism, so that the king post may be moved to any desired position for steering purposes.

We claim:

1. A four-wheel drive tractor comprising a pair of supporting frames pivotally connected to each other on a frame pivoting vertical axis between said frames, a driving axle on each frame with the frame pivoting vertical pivot axis between said axles, an articulation point member for the attachment of an articulated trailer, and means on at least one of said supporting frames and on which said articulation point member is mounted for automatically moving said articulation point member laterally in relation to the supporting frame on which it it positioned in the same direction as the tractor is steered, the amount of such relative lateral movement being dependent on the relative angular position of said axles, said means comprising an arm pivotally mounted on said one of said supporting frames for pivoting movement about an articulation point vertical axis, said articulation point member being mounted on said arm at a point spaced from the articulation point vertical axis, and arm turning means coupled to said arm for turning said arm about said articulation point vertical axis automatically in response to a change of relative angular position of said axles for moving the articulation point laterally in relation to the supporting frame on which it is mounted.

2. A four-wheel drive tractor as claimed in claim 1 in which said arm turning means comprises a first gear element on said arm concentric with said articulation point vertical axis of said arm, said first gear element being fast with said arm, and a second gear element concentric with the frame pivoting vertical pivot axis about which said supporting frames are connected and being releasably fixed to the other supporting frame, said second gear element being engaged with said first gear element.

3. A four-wheel drive tractor as claimed in claim 2 further comprising means coupled to said second gear element for releasing said second gear element from said other supporting frame and coupled to said arm for anchoring said arm to said one supporting frame to permit said second gear element to turn about the frame pivoting pivotal axis about which the supporting frames are connected and prevent said arm from turning about said articulation point vertical axis.

4. A four-wheel drive tractor as claimed in claim 1 in which said arm turning means comprises a hydraulic means coupled to said arm and responsive to a change of the relative angular position of said supporting frames for turning said arm about said articulation point vertical axis.

5. A four-wheel drive tractor comprising a pair of supporting frames pivotally connected to each other on a frame pivoting vertical axis between said frames, a driving axle on each frame with the frame pivoting vertical pivot axis between said axles, an articulation point member for the attachment of an articulated trailer, and means on one of said supporting frames and on which said articulation point member is mounted for automatically moving said articulation point member laterally in relation to the supporting frame on which it is positioned in the same direction as the tractor is steered, the amount of such relative lateral movement being dependent on the relative angular position of said axles and means under the control of the operator and coupled to said mounting and moving means for overriding said means for automatically moving said articulation point member.

6. A four-wheel drive tractor comprising a pair of supporting frames, one of which is a forward frame and the other a trailing frame, a pivot means positioned on a single vertical axis pivotally connecting said frames to each other about said single vertical axis and about which one frame can be moved relative to the other frame in a horizontal plane, a driving axle on each frame with the said single vertical axis being between said axles, a movable articulation point member for attachment of an articulated trailer, a movable member mounted on said trailing frame and on which said articulation point member is mounted at a position over said trailing frame, and moving means coupled to said movable member for automatically moving said movable member over the trailing frame to move said articulation point member laterally over the trailing frame, when the forward frame is moved horizontally relative to the trailing frame to steer the tractor, to the same side of said vertical axis as said forward frame is moved and a distance depending on the angle between the forward frame and the trailing frame.

References Cited by the Examiner
UNITED STATES PATENTS 2,594,695    4/1952    Storey _____ 180—50 X
3,007,590    11/1961    Matthew et al. _____ 180—51 X A. HARRY LEVY, *Primary Examiner.*